US009225253B2

(12) United States Patent
Lei

(10) Patent No.: US 9,225,253 B2
(45) Date of Patent: Dec. 29, 2015

(54) HIGH VOLTAGE SWITCHING LINEAR AMPLIFIER AND METHOD THEREFOR

(71) Applicant: Microchip Technology, Inc., Chandler, AZ (US)

(72) Inventor: Jimes Lei, Milpitas, CA (US)

(73) Assignee: Microchip Technology Inc., Chandler, AZ (US)

( * ) Notice: Subject to any disclaimer, the term of this patent is extended or adjusted under 35 U.S.C. 154(b) by 243 days.

(21) Appl. No.: 13/658,640

(22) Filed: Oct. 23, 2012

(65) Prior Publication Data

US 2014/0112024 A1  Apr. 24, 2014

(51) Int. Cl.
*H02M 3/335* (2006.01)
*H02M 3/158* (2006.01)
*H02M 3/337* (2006.01)
*H02M 7/10* (2006.01)
*H02M 1/00* (2007.01)

(52) U.S. Cl.
CPC .......... *H02M 3/33569* (2013.01); *H02M 3/158* (2013.01); *H02M 3/337* (2013.01); *H02M 7/103* (2013.01); *H02M 2001/007* (2013.01); *H02M 2001/0045* (2013.01)

(58) Field of Classification Search
CPC ... H02M 7/10; H02M 7/4807; H02M 7/4826; H02M 2001/007; H02M 2001/0045
USPC ......... 323/222–225, 265–277, 282–285, 288, 323/207; 363/17, 59–61, 89; 327/536–538
See application file for complete search history.

(56) References Cited

U.S. PATENT DOCUMENTS

| 3,494,437 | A | * | 2/1970 | Fathauer ....................... 177/200 |
| 3,558,998 | A | * | 1/1971 | Bertolasi ................... 315/227 A |
| 3,818,484 | A | * | 6/1974 | Nakamura et al. ............ 368/204 |
| 4,217,633 | A | * | 8/1980 | Evans, Jr. ........................ 363/27 |
| 4,240,009 | A | * | 12/1980 | Paul .............................. 315/224 |
| 4,517,472 | A | * | 5/1985 | Ruitberg et al. ................ 307/82 |
| 4,694,383 | A | * | 9/1987 | Nguyen et al. .................. 363/17 |
| 4,969,076 | A | * | 11/1990 | Schutten et al. ................ 363/17 |
| 4,994,953 | A | * | 2/1991 | Haak .............................. 363/71 |
| 5,231,564 | A | * | 7/1993 | Pellegrino et al. ............. 363/61 |
| 5,363,288 | A | * | 11/1994 | Castell et al. .............. 363/21.12 |
| 5,731,730 | A | * | 3/1998 | Muto ............................ 327/323 |
| 5,748,458 | A | * | 5/1998 | Ochiai ........................... 363/17 |
| 5,821,701 | A | * | 10/1998 | Teggatz et al. ................ 315/307 |
| 5,854,538 | A | * | 12/1998 | Krummel ...................... 315/105 |
| 5,856,916 | A | * | 1/1999 | Bonnet .......................... 363/20 |
| 5,905,369 | A | * | 5/1999 | Ishii et al. ..................... 323/272 |
| 5,914,866 | A | * | 6/1999 | Eguchi et al. ................... 363/40 |
| 5,973,367 | A | * | 10/1999 | Williams ...................... 257/365 |
| 6,078,182 | A | * | 6/2000 | Gorrell ......................... 324/713 |
| 6,222,351 | B1 | * | 4/2001 | Fontanella et al. ........... 323/267 |
| 6,518,838 | B1 | * | 2/2003 | Risbo ............................. 330/10 |
| 7,266,002 | B2 | * | 9/2007 | Zhang et al. .................... 363/60 |
| 7,485,987 | B2 | * | 2/2009 | Mori et al. ...................... 307/63 |

(Continued)

*Primary Examiner* — Timothy J Dole
*Assistant Examiner* — Yusef Ahmed
(74) *Attorney, Agent, or Firm* — Burr & Forman LLP; Ryan M. Corbett

(57) ABSTRACT

A switching linear amplifier has a DC-DC converter to increase a low input DC voltage to a first high voltage DC. A high voltage high frequency inverter is coupled to the DC-DC converter to generate high voltage pulses. A multistage voltage multiplier is coupled to the high voltage high frequency inverter to generate a second high voltage DC. A controlled charge and discharge circuit is coupled to the multistage voltage multiplier to drive a capacitive load.

20 Claims, 5 Drawing Sheets

(56) References Cited

U.S. PATENT DOCUMENTS

| | | | |
|---|---|---|---|
| 7,948,774 B2* | 5/2011 | Scheel et al. | 363/17 |
| 8,009,444 B2* | 8/2011 | Duan et al. | 363/21.04 |
| 8,300,431 B2* | 10/2012 | Ng et al. | 363/21.12 |
| 8,427,113 B2* | 4/2013 | Xing et al. | 320/145 |
| 8,611,107 B2* | 12/2013 | Chapman et al. | 363/21.04 |
| 8,737,093 B1* | 5/2014 | Baker et al. | 363/21.03 |
| 2002/0012257 A1* | 1/2002 | Takahama et al. | 363/95 |
| 2002/0067631 A1* | 6/2002 | Lunding et al. | 363/131 |
| 2003/0173909 A1* | 9/2003 | Danjo et al. | 315/291 |
| 2006/0028850 A1* | 2/2006 | Brooks et al. | 363/65 |
| 2006/0171182 A1* | 8/2006 | Siri et al. | 363/131 |
| 2007/0008745 A1* | 1/2007 | Joshi et al. | 363/21.01 |
| 2007/0147098 A1* | 6/2007 | Mori et al. | 363/71 |
| 2007/0164007 A1* | 7/2007 | Peters et al. | 219/130.51 |
| 2008/0055939 A1* | 3/2008 | Yao et al. | 363/16 |
| 2008/0062724 A1* | 3/2008 | Feng et al. | 363/17 |
| 2008/0157732 A1* | 7/2008 | Williams | 323/266 |
| 2008/0203991 A1* | 8/2008 | Williams | 323/288 |
| 2008/0278870 A1* | 11/2008 | Deng et al. | 361/31 |
| 2008/0284345 A1* | 11/2008 | Kastle et al. | 315/224 |
| 2008/0315781 A1* | 12/2008 | Ikeda et al. | 315/224 |
| 2009/0027027 A1* | 1/2009 | Lin et al. | 323/285 |
| 2009/0184765 A1* | 7/2009 | Chaoui | 330/251 |
| 2009/0290395 A1* | 11/2009 | Osaka | 363/126 |
| 2010/0027169 A1* | 2/2010 | Knott et al. | 361/18 |
| 2010/0073082 A1* | 3/2010 | Takeshita et al. | 327/581 |
| 2010/0226156 A1* | 9/2010 | Hanington | 363/126 |
| 2011/0205766 A1* | 8/2011 | Rodriguez | 363/37 |
| 2011/0242853 A1* | 10/2011 | Agarwal et al. | 363/16 |
| 2012/0033476 A1* | 2/2012 | Endo | 363/132 |
| 2012/0146554 A1* | 6/2012 | Smick et al. | 315/506 |
| 2012/0169313 A1* | 7/2012 | Lee et al. | 323/282 |
| 2012/0262437 A1* | 10/2012 | Keller et al. | 345/211 |
| 2013/0027013 A1* | 1/2013 | Lee et al. | 323/283 |
| 2013/0258731 A1* | 10/2013 | Xu et al. | 363/78 |
| 2013/0286704 A1* | 10/2013 | Liu et al. | 363/132 |

* cited by examiner

HIGH VOLTAGE SWITCHING LINEAR AMPLIFIER AND METHOD THEREFOR

BACKGROUND

Portable consumer electronics such as cellular phones, netbooks, tablets, and portable games can be enhanced with mechanical feedback to stimulate the user. A couple of examples would be vibration from a motor or haptic feedback from a piezoelectric transducer. The addition of some form of physical stimulation makes the product much more attractive. Engineers are constantly trying to invent and/or develop some form of material to help create physical stimulation. As a result, an electroactive polymer, developed by Artificial Muscle Inc, can be used to generate haptic mechanical feedback. The material requires an analog voltage up to 500 Hz with an amplitude of 1000V. The electrical behavior of the material is mainly capacitive of about 2 nF. Another company, Senseg, develop a material based on electro-sensory effects to generate haptic feedback by Coulomb force. The material requires digital pulses up to 500 Hz with an amplitude of 3000V. The electrical behavior of this material is also mainly capacitive of about 500 pF.

The high voltages required to drive these materials are not readily available in battery powered portable equipment. Any circuitry for portable electronics should be physically as small as possible. Portable consumer electronics are commonly powered by lithium batteries which has an operating voltage range of about 3.0V to 4.2V. Therefore, a circuit topology that is physically small, operates from a low voltage source, such as a single lithium cell battery, and generates an output that can be either a high voltage analog waveform or high voltage digital pulses is therefore warranted.

SUMMARY

A switching linear amplifier has a DC-DC converter to increase a low input DC voltage to a first high voltage DC. A high voltage high frequency inverter is coupled to the DC-DC converter to generate high voltage pulses. A multistage voltage multiplier is coupled to the high voltage high frequency inverter to generate a second high voltage DC. A controlled charge and discharge circuit is coupled to the multistage voltage multiplier to drive a capacitive load.

A switching linear amplifier has a charge pump coupled to a source for supplying a DC voltage. A DC-DC converter is coupled to the charge pump to increase the DC voltage to a first high voltage DC. A high voltage high frequency inverter is coupled to the DC-DC converter to generate high voltage pulses, wherein the high voltage high frequency inverter generates two outputs, wherein the two outputs are approximately 180 degrees out of phase with respect to each other. A multistage voltage multiplier is coupled to the high voltage high frequency inverter to generate a second high voltage DC. A controlled charge and discharge circuit is coupled to the multistage voltage multiplier to drive a capacitive load.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

The present invention is a circuit and method of generating high voltage digital pulses or a high voltage analog waveform in excess of 1000V to 5000V from a low voltage source that is very compact making it suitable for handheld portable application. A simplified block diagram of the present invention is shown in FIG. 1.

Figure 1:
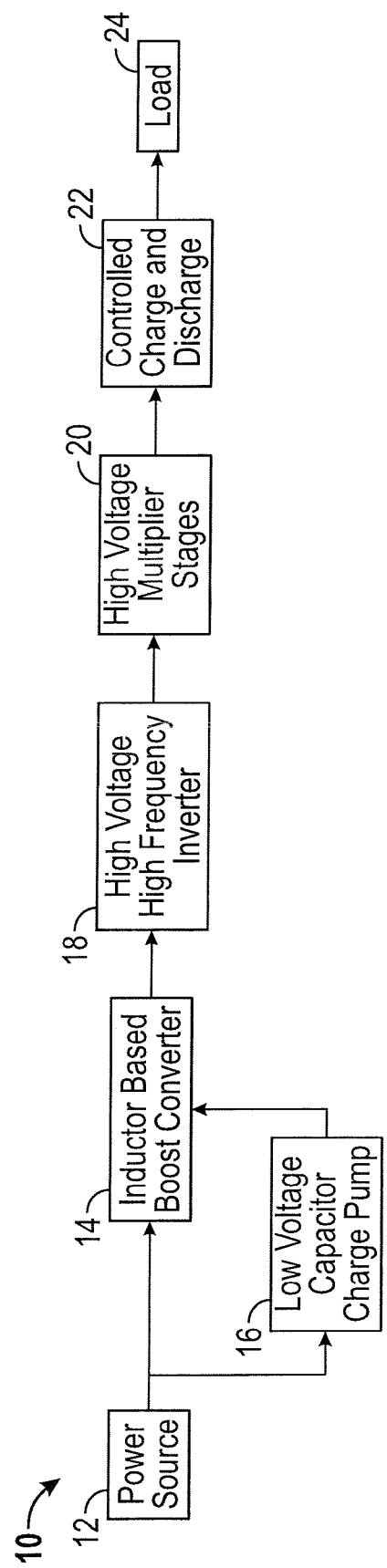
FIG. 1 is a simplified block diagram of a high voltage switching linear amplifier of the present invention.

Referring to FIG. 1, a circuit 10 of the present invention is shown. The circuit 10 may be a high voltage switching linear amplifier. The circuit 10 may be designed to operates from a low voltage source, such as a single lithium cell battery, and generates an output that can be either a high voltage analog waveform or high voltage digital pulses. The circuit 10 may have a Power Source 12. The Power Source 12 may be the main input voltage. The Power Supply 12 may be a low voltage source such as a battery. The Power Supply 12 may be a low voltage source and can be but not limited to 3.0V to 12V. The Power Supply 12 may be the input power for the high voltage switching linear amplifier circuit 10 and is not limited to just one supply. For example, there can be a regulated 3.3V for the control circuitry and a battery voltage for the power conversion.

The Power Supply 12 may be coupled to a boost converter 14. The boost converter 14 may be an inductor based boost converter. The boost converter 14 may further be a DC-DC converter. In accordance with one embodiment, the boost converter 14 may be an inductor based DC-DC converter 14A. The boost converter 14 may be used to boosts the input voltage. In accordance with one embodiment, the boost converter 14 may be used to generate a 300V DC output. The circuit 10 may have a charge pump 16. In accordance with one embodiment, the charge pump 16 is a low voltage capacitor charge pump 16A. The low voltage capacitor charge pump 16A may be coupled to the boost converter 14. The low voltage capacitor charge pump 16A may be used to increase the input voltage to the circuit 10. In accordance with one embodiment, the low voltage capacitor charge pump 16A may be used to increase the input voltage to at least 10V. This will provide adequate gate drive voltage for the inductor based boost converter 14 when input voltages of less than 5.0V are used. The higher gate voltage will lower the on-resistance of the converter MOSFET to increase the overall efficiency.

The output of the boost converter 14 may be coupled to an inverter 18. The inverter 18 may be a high voltage high frequency inverter 18A. The inverter 18 may be used to convert the output of the boost converter 14 input into pulses that are 180 degrees out of phase from each other. In accordance with one embodiment, the high voltage high frequency inverter 18A may be used to convert the 300V DC input into two 0V to 300V pulses that are 180 degrees out of phase from each other. The pulses may be in the 50 kHz range with a duty cycle of 50%.

The two outputs from the inverter 18 may be used to drive high voltage multiplier stages 20. The high voltage multiplier stages 20 may be used to generate a DC voltage that is a multiple of the outputs from the inverter 18. Thus, in accordance with the embodiment where the high voltage high frequency inverter 18A may be used to convert the 300V DC input into two 0V to 300V pulses that are 180 degrees out of phase from each other, the high voltage multiplier stages 20 may be used to generate a DC voltage that is a multiple of the 300V by the number of stages minus a few forward voltage diode drops. Ignoring the diode drops, four stages will generate an output DC voltage of approximately 4×300V, 1200V.

The output of the high voltage multiplier stages 20 may be coupled to a controlled charge and discharge circuit 22. The controlled charge and discharge circuit 22 may be used to drive the output load 24. The voltage seen by the output load 24 can be either high voltage pulses or high voltage analog waveforms.

Figure 2:
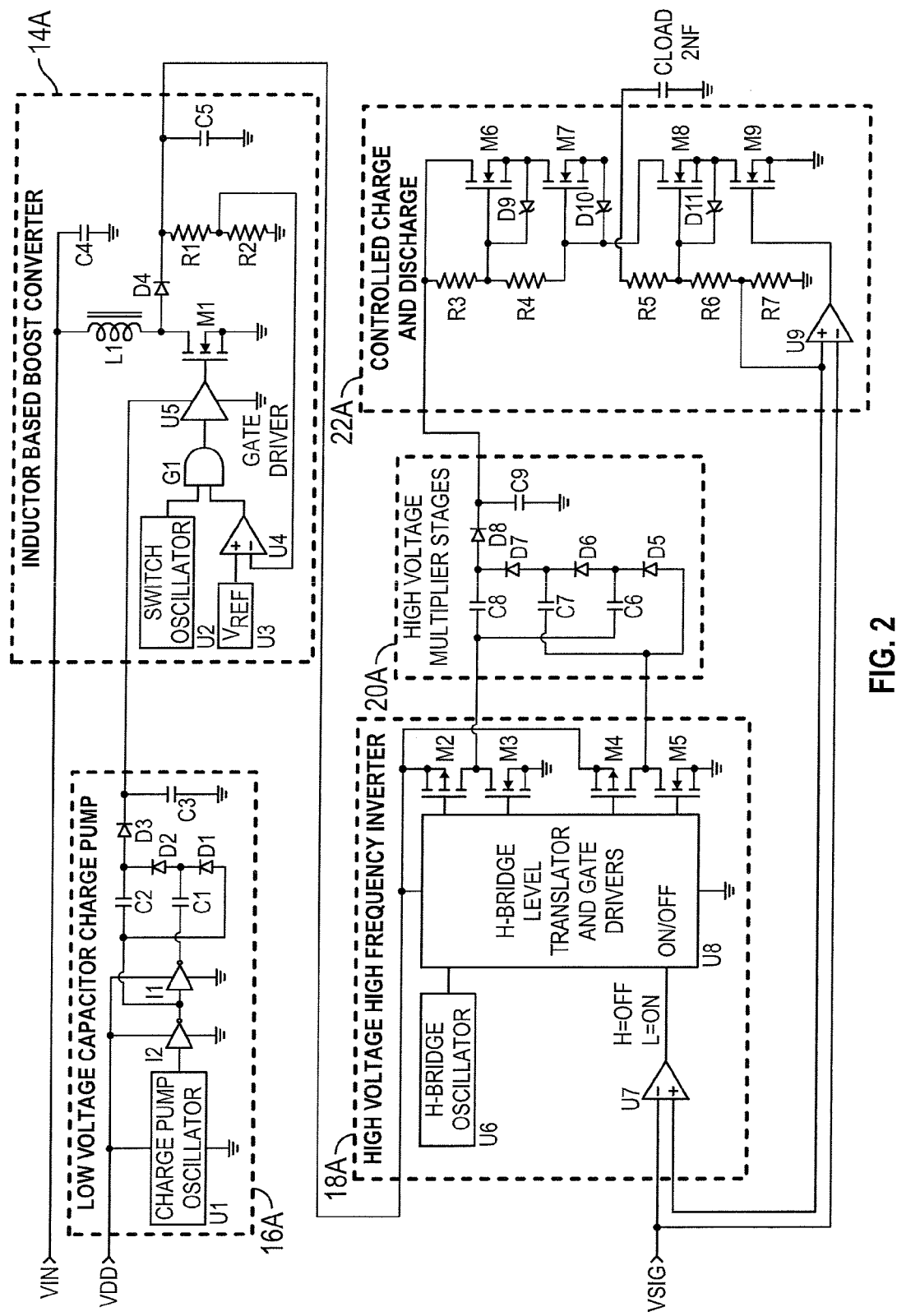
FIG. 2 is a detailed block diagrams of a high voltage switching linear amplifier for a 1000V analog output waveform of the present invention.

FIG. 2 shows a detailed circuit diagram of the circuit 10 for a 1000V analog output waveform. In this embodiment, the circuit 10 has a low voltage capacitor charge pump 16A. The low voltage capacitor charge pump 16A has a charge pump oscillator U1 coupled to the Power Source 12. The charge pump oscillator U1 may be coupled to an inverter I2. The output of the inverter I2 may be coupled to an inverter I1 and to a capacitive element C2. The output of the inverter I1 may be coupled to a capacitive element C1. A plurality of diodes D1, D2, and D3 are connected is series and coupled to capacitive elements C1 and C2. A capacitive element C3 is coupled to the diode D3.

The low voltage capacitor charge pump 16A is coupled to the inductor based boost converter 14A. In this embodiment, the inductor based converter 14A may have a gate driver U5. The gate driver U5 may be used to control the switching of N-channel M1.

The gate driver U5 may be coupled to the inductor based boost converter 14A and to the output of logic gate G1. The logic gate G1 may have an input coupled to a switch oscillator U2 and to a comparator U4. The comparator U4 has one input coupled to a reference voltage source U3 and a second input coupled to a node between resistive elements R1 and R2. The resistive elements R1 and R2 may be coupled together in series. The N-channel M1 may be coupled to an inductor L1 and a diode D4. The inductor may be coupled to a capacitive element C4. The capacitive element C4 may also be coupled to a voltage signal Vin. The diode D4 may be coupled to the resistive element R1 and to a capacitive element C5.

The output of the inductor based boost converter 14A may be coupled to the high voltage high frequency inverter 18A. In the embodiment shown in FIG. 3, the high voltage high frequency inverter 18A may have an H-bridge level translator and gate drivers circuit U8 coupled to the output of the inductor based boost converter 14A. The H-bridge level translator and gate drivers circuit U8 may be coupled to a comparator U7. The output of the comparator U7 may be used to turn the H-bridge level translator and gate drivers circuit U8 on/off. The comparator U7 has inputs coupled to a voltage signal Vsig and to the controlled charge and discharge circuit 22. An H-bridge oscillator U6 may also be coupled to the H-bridge level translator and gate drivers circuit U8. The output of the H-bridge level translator and gate drivers circuit U8 may be coupled to a plurality of MOSFETs M2, M3, M4 and M5.

The MOSFETs M2, M3, M4 and M5 may be coupled to the high voltage multiplier stages 20. In the embodiment depicted in FIG. 2, the high voltage multiplier stages 20A may be comprised of a plurality of capacitive elements C6, C7, and C8 each coupled to the high voltage high frequency inverter 18A. Diodes D5 and D6 may be coupled to capacitive elements C6 and C7. Diodes D7 may be coupled to capacitive element C8. Diode D8 may be coupled to capacitive element C8 and C9.

The output of the high voltage multiplier stages 20 may be coupled to controlled charge and discharge circuit 22. In the embodiment shown in FIG. 2, the controlled charge and discharge circuit 22A may have resistive elements R3, R4, R5, R6 and R7. Resistive elements R3 and R4 are coupled in series. A MOSFET M6 and a Zener diode D9 are coupled to a node between resistive elements R3 and R4. A MOSFET M7 and a Zener diode D10 are coupled to the resistive element R4. A MOSFET M8 and a Zener diode D11 are coupled to a node between resistive elements R5 and R6. A comparator may have an output coupled to the MOSFET M9. The op amp U9 has an input coupled to the node between resistive elements R6 and R7 and an input coupled to a voltage signal Vsig.

In operation, if the Power Source voltage is too low, for example 3.0V to 4.2V, it is not high enough for the MOSFET Gate Driver, U5, to drive the gate of the N-channel MOSFET, M1, sufficiently to achieve low on-resistance. Typical N-channel MOSFET will require a minimum gate to source voltage of 4.5V to 10V for it to achieve low on-resistance. The low voltage capacitor charge pump 16A is provided to increase the power source voltage. The low voltage capacitor charge pump 16A can be either one, two, three, or four stages where the output voltage is approximately the power source voltage times the number of stages. For example, with a 3.0V power source, a three stage capacitor charge pump will have an output voltage of approximately 9V. If the power source is 10V, then the capacitor charge pump is not needed and can be disabled. If the power source is 6.0V, then using the capacitor charge pump is optional.

The output of the low voltage capacitor charge pump 16A is the supply voltage for the MOSFET gate driver, U5. The MOSFET gate driver U5 can level translate the input signals from the logic gate, G1 and provide an output signal with an amplitude set by the output of the low voltage capacitor charge pump 16A. For example, the input to the MOSFET gate driver U5 can be a digital signal from 0 to 3V and the output can be 0V to 9V with a three stage charge pump.

The inductor based DC-DC converter 14A takes in a low DC voltage and outputs a DC voltage greater than the input. The inductor, L1, is being charged when the N-channel MOSFET, M1, is on. When M1 is off, the inductor L1 discharges its energy into capacitor C5 through diode D4. The voltage on capacitive element C5 increases with every inductor L1 discharge cycle. Resistive elements R1 and R2 sense the voltage on the capacitive element C5. Once the output DC voltage reached the desired voltage, the output of comparator U4 goes low and MOSFET M1 is turned off until the output DC voltage falls below the desired voltage. A suitable voltage for the output of the inductor based DC-DC converter 14A would be 250V to 350V range.

The output voltage of the inductor based DC-DC converter 14A is the input supply voltage for the high voltage high frequency inverter 18A. The high voltage high frequency inverter 18A has two outputs which are 180 degrees from each other. The first output is from the node connecting MOSSFETs M2 and M3. The second output is the node connecting MOSFETs M4 and M5. The H-bridge level translator and gate driver circuit U8 drives MOSFETs M2, M3, M4, and M5 such the outputs are 180 degrees from each other, at 50% duty cycle, and at a frequency set by H-bridge oscillator U6. H-bridge oscillator U6 can generates a frequency range of 25 kHz to 200 kHz. If H-bridge oscillator U6 is set for 50 kHz and the voltage on capacitive element C5 is 300V, then the outputs from the high voltage high frequency inverter 18A may be 300V, 50 kHz square wave pulses that are 180 degrees from each other.

The 50 kHz pulses are used to drive the high voltage multiplier stages 20A which may consists of diodes D5, D6, D7 and D8 and capacitive elements C6, C7, C8 and C9. The final DC voltage is rectified by diode D8 and stored on capacitive element C9. The number of stages can be increased. Every additional capacitor and diode will constitute an additional stage. The output voltage for the high voltage multiplier stages 20A is approximately the input voltage amplitude from the high voltage high frequency inverter 18A times the number of stages. FIG. 2 shows the high voltage multiplier stages 20A having four stages. If the pulses are 300V, and there are four stages, the output voltage on capacitive element C9 will be 4 times 300V, 1200V.

The output of the high voltage multiplier stages 20A is the input supply voltage for the controlled charge and discharge circuit 22A. The load 24, Cload, is connected in between the charging and discharging circuits of the controlled charge and discharge circuit 22A. Resistive elements R3 and R4, N-channel MOSFETs M6 and M7, Zener diodes D9 and D10 constitute the charging portion of the circuit. Resistive elements R5, R6 and R7, N-channel MOSFETs M8 and M9, Zener diode D11 and op-amp U9 constitutes the discharging portion of the circuit. MOSFETs M6, M7, M8, and M9 may be 600V N-channel MOSFETs. They may be used in a stacked configuration to share the high voltage equally. Resistive elements R3 and R4 are balancing resistors that are equal value dividing the voltage in half so MOSFETs M6 and M7 would only need to hold off half the voltage. Similarly, resistive elements R5 and R6 are also balancing resistors that are equal value so MOSFETs M8 and M9 would only need to hold off half the voltage. Resistive element R7 is a much lower value, 500 times lower, than resistive elements R5 and R6 so it would have very little effect on the dividing the voltage in half. Each transistor will only see 600V but because of their configuration, the circuit can operate up to 1200V. Op-amp U9 sensing the voltage across the load 24, Cload with resistor divider R5, R6 and R7. The voltage across resistive element R7 may be regulated to Vsig. If Vsig is a sinusoidal waveform, the voltage across resistive element R7 may also be a sinusoidal waveform. Op amp U9 may allow MOSFETS M8 and M9 to discharge the load 24, Cload if the voltage is too high. The voltage across resistive element R7 may also connected to comparator U7. When the output voltage reaches the desired voltage, comparator U7 turns off the high voltage high frequency inverter 18A to save power otherwise it would be on allowing MOSFETs M6 and M7 to charge the load 24, Cload. Additional resistor, diode, and MOSFET sets may be added to increase the operating voltage above 1200V.

Figure 3:
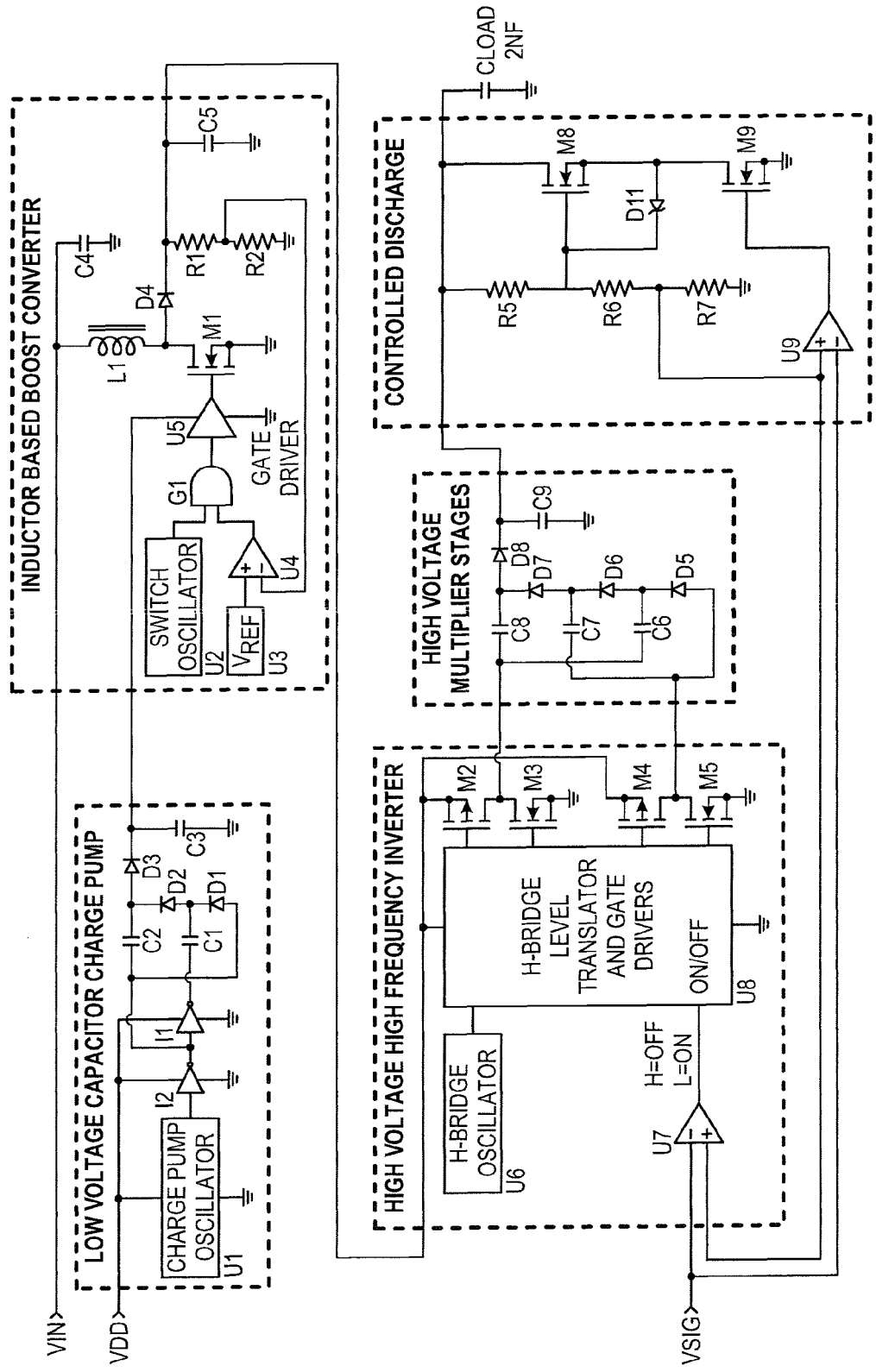
FIG. 3 is a detailed block diagrams of a high voltage switching linear amplifier for a 1000V analog output waveform without controlled charge circuit of the present invention.

There is a tradeoff in efficiency versus the number of components. FIG. 3 shows a configuration where the controlled charging circuit, resistors R3 and R4, transistors M6 and M6, and Zener diodes D9 and D10 have been removed.

Referring to FIG. 3, the output of the high voltage multiplier stages 20A is now connected to both the capacitive element C9 and the load 24, Cload. When the load 24, Cload needs to be discharged, the capacitive element C9 and the DC components on the capacitive elements C6, C7, and C8 may also be discharged. When charging the load 24, Cload, capacitive element C9 and the DC components on capacitive elements C6, C7, and C8 may also need to be charged. This will waste energy as there is no benefit in discharging capacitive element C9 and the DC components on capacitive elements C6, C7, and C8. This may however eliminate resistive elements R3 and R4, MOSFETs M6 and M6, and Zener diodes D9 and D10. Careful selection for component values of capacitive elements C9, C6, C7 and C8 may help minimize losses.

Figure 4:
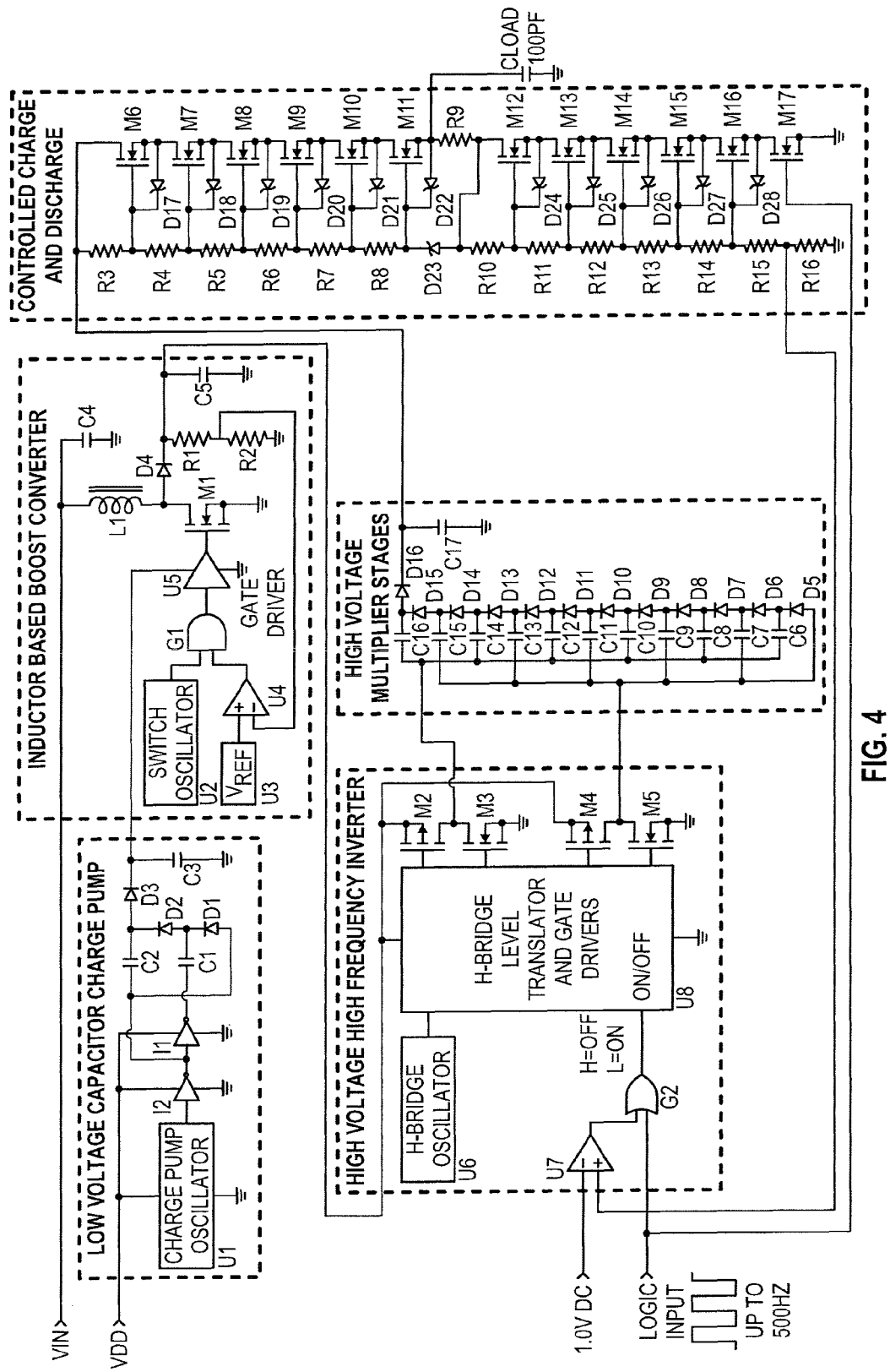
FIG. 4 is a detailed block diagrams of a high voltage switching linear amplifier for a 3000V digital output waveform of the present invention.

With some modifications on FIG. 2, a 3000V digital output waveform can be created. FIG. 4 shows the detailed block diagrams of the high voltage switching linear amplifier for a 3000V digital output waveform of the present invention.

Referring to FIG. 4, in this embodiment, the high voltage high frequency inverter 18A' further includes a logic OR gate, G2. This allows for a low frequency logic input of 50 Hz to 500 Hz. When the logic input is high, the H-bridge level translator and gate driver circuit U8 is turned off. When comparator U7 senses that the output voltage is in regulation set by the 1.0V reference voltage, the comparator U7 may output a logic high to the logic gate G2 which may output a logic high to the H-bridge level translator and gate driver circuit U8 turning it off.

In this embodiment, the high voltage multiplier stage 20A' now has 12 stages. If the output voltage from the inductor based DC-DC converter 14A is 300V, then C17 is expected to be 3600V minus 12 forward voltage diode drops.

In the present embodiment, the controlled charge and discharge circuit 22A' has more transistors in series to accommodate for the higher voltage. Six for the controlled charge, MOSFETs M6, M7, M8, M9, M10, M11 and six for the controlled discharge, MOSFETs M12, M13, M14, M15, M16, M17. Each MOSFET has a breakdown voltage of 600V. The circuit will be able to operate up to 3600V. Resistive element R16 is added to sense the voltage on load 24, Cload. The voltage across resistive element R16 is 1/3000 of the load 24, Cload. 3000V across load 24, Cload will produce 1.0V across resistive element R16. The voltage across resistive element R16 is connected to comparator U7 which has a reference voltage of 1.0V. Once the load 24, Cload reaches 3000V, the output of comparator U7 may produce a logic high to logic gate G2 to turn off the H-bridge level translator and gate driver circuit U8. Different amplitudes across the load 24, Cload can be obtained by changing the 1.0V reference to different values.

Figure 5:
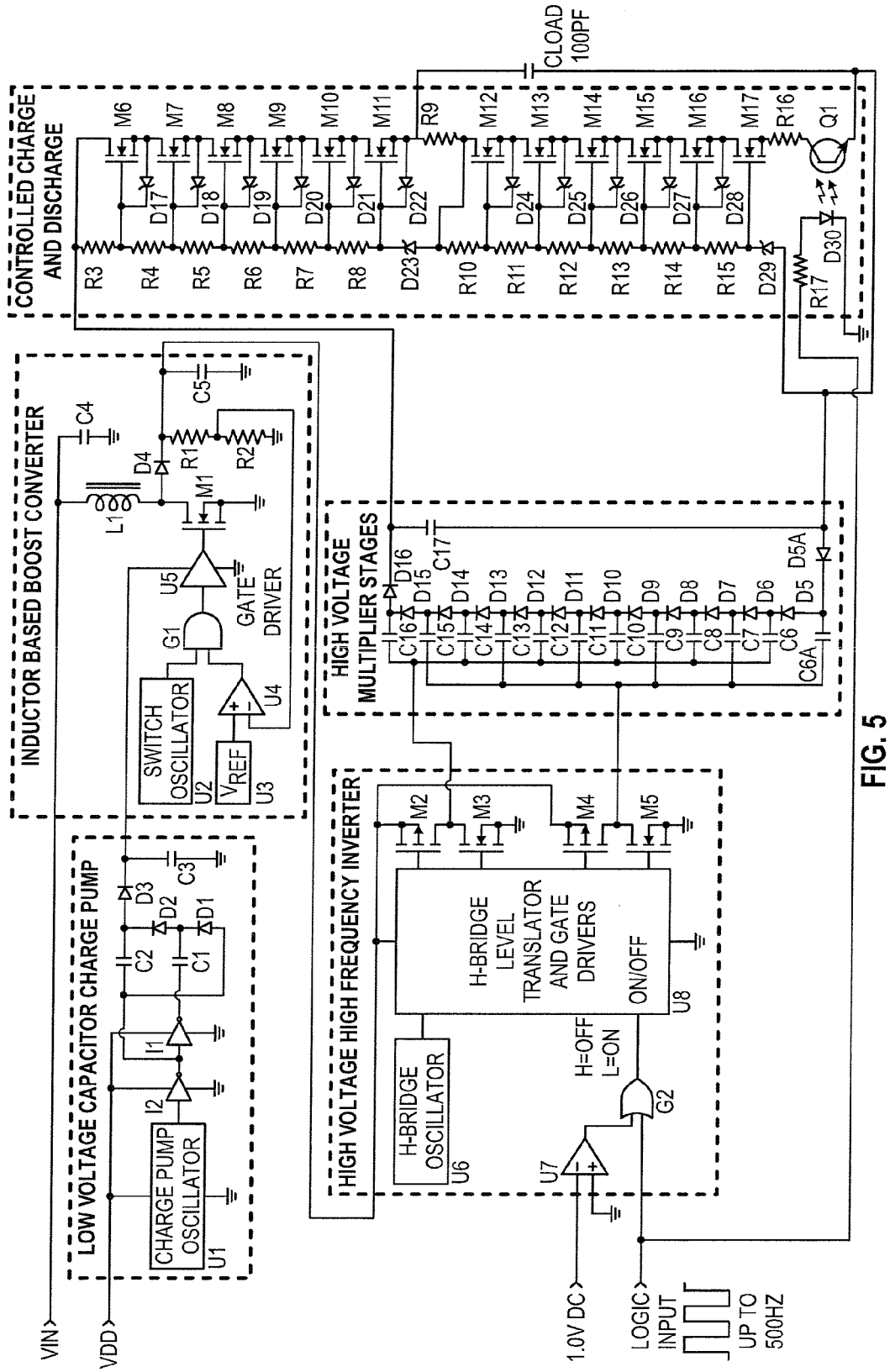
FIG. 5 is a detailed block diagrams of a high voltage switching linear amplifier for a 3000V digital output waveform with a floating ground output of the present invention.

With some modifications on FIG. 4, the ground reference for the load 24, Cload can be arbitrary. This will allows either the positive side or the negative side of the load, Cload to be grounded. The load 24, Cload can be a floating ground. FIG. 5 shows the detailed block diagrams of the high voltage switching linear amplifier for a 3000V digital output waveform with a floating ground output of the present invention.

Referring to FIG. 5, high voltage multiplier stage 20A' has capacitive element C6A and diode D5A added. Capacitive element C17 ground connection is removed and is connected to the anode of D5A. This node can be referred to as the negative side of load 24, Cload. The potential difference across capacitive element C17 may still be 3000V but it's ground reference is now floating.

An opto-coupler, consisting of diode D30 and transistor Q1, resistive element R17, and Zener diode D29 has been added to the controlled charge and discharge circuit 22A'. The anode of D29 and the emitter of transistor Q1 are both connected to the negative side of the load 24, Cload. This allows the ground for the load 24, Cload to be floating. If the positive side of the load 24, Cload is at ground potential, then the negative side of the load 24, Cload will have −3000V pulses.

While embodiments of the disclosure have been described in terms of various specific embodiments, those skilled in the art will recognize that the embodiments of the disclosure may be practiced with modifications within the spirit and scope of the claims.

The invention claimed is:

1. A switching linear amplifier comprising:
   a DC-DC converter to increase a low input DC voltage to a first high voltage DC;
   a high voltage high frequency inverter coupled to the DC-DC converter to generate high voltage pulses;
   a multistage voltage multiplier coupled to the high voltage high frequency inverter to generate a second high voltage DC; and
   a controlled charge and discharge circuit coupled to the multistage voltage multiplier to drive a capacitive load;
   wherein the controlled charge and discharge circuit comprises:
   a first series stacked N-channel MOSFETs with balancing resistors for a controlled charge; and
   a second series of stacked N-channel MOSFETs with balancing resistors for a controlled discharge.

2. The amplifier of claim 1, further comprising a charge pump coupled to the DC-DC converter.

3. The amplifier of claim 1, where the DC-DC converter is comprises:
   a MOSFET;
   a gate driver for turning on and off the MOSFET;
   an inductor coupled to the MOSFET;
   a diode coupled to the inductor and the MOSFET; and
   a high voltage capacitor coupled to the diode;
   wherein the inductor is charged from the low input DC voltage and then discharged through the diode into the high voltage capacitor to generate the first high voltage DC.

4. The amplifier of circuit topology of claim 1, wherein the high voltage high frequency inverter generates two outputs, wherein the two outputs are approximately 180 degrees out of phase with respect to each other.

5. The amplifier of claim 4, wherein the high voltage high frequency inverter comprises a comparator to turn off the high voltage high frequency inverter when the output voltage is in regulation.

6. The amplifier of claim 4, wherein the high voltage high frequency inverter comprises:
   a comparator to turn off the high voltage high frequency inverter when the output voltage is in regulation; and
   a logic gate to turn the comparator on and off at a desired frequency.

7. The amplifier of claim 1, wherein the multistage voltage multiplier comprises:
   a series of stacked diodes where the last diode goes to a high voltage capacitor;
   an individual capacitor connecting to each node of the stacked diodes where an anode and cathode of two diodes are connected together;
   wherein the other side of every capacitor are driven by high voltage pulses from the high voltage high frequency inverter.

8. The amplifier of claim 1, wherein
   the controlled charge and controlled discharge is controlled by an operational amplifier.

9. The amplifier of claim 1, wherein the controlled charge and discharge circuit comprises a series stacked N-channel MOSFETs with balancing resistors for a controlled discharge, wherein the controlled discharge is controlled by an operational amplifier.

10. The amplifier of claim 1, wherein the controlled charge and discharge circuit comprises:
    an opto-coupler to allow the output load to have an undefined floating ground.

11. The amplifier of claim 1, wherein the multistage voltage multiplier generates the second high voltage DC by multiplying an input voltage by an integer that is equal to a number of stages of the multistage voltage multiplier.

12. A switching linear amplifier comprising:
    a charge pump to increase a low input DC voltage source for supplying a higher DC voltage for a gate driver;
    a DC-DC converter to increase a low input DC voltage to a first high voltage DC and coupled to the charge pump to provide adequate gate drive voltage for increased efficiency;
    a high voltage high frequency inverter coupled to the DC-DC converter to generate high voltage pulses, wherein the high voltage high frequency inverter generates two outputs, wherein the two outputs are approximately 180 degrees out of phase with respect to each other;
    a multistage voltage multiplier coupled to the high voltage high frequency inverter to generate a second high voltage DC; and
    a controlled charge and discharge circuit coupled to the multistage voltage multiplier to drive a capacitive load;
    wherein the controlled charge and discharge circuit comprises:
    a first series stacked N-channel MOSFETs with balancing resistors for a controlled charge; and
    a second series of stacked N-channel MOSFETs with balancing resistors for a controlled discharge.

13. The amplifier of claim 12, where the DC-DC converter comprises:
    a MOSFET;
    a gate driver for turning on and off the MOSFET;
    an inductor coupled to the MOSFET;
    a diode coupled to the inductor and the MOSFET; and
    a high voltage capacitor coupled to the diode;
    wherein the inductor is charged from the low input DC voltage and then discharged through the diode into the high voltage capacitor to generate the first high voltage DC.

14. The amplifier of claim 12, wherein the multistage voltage multiplier comprises:
    a series of stacked diodes where the last diode goes to a high voltage capacitor;
    an individual capacitor connecting to each node of the stacked diodes where an anode and cathode of two diodes are connected together;
    wherein the other side of every capacitor are driven by high voltage pulses from the high voltage high frequency inverter.

15. The amplifier of claim 12,
    wherein the controlled charge and controlled discharge is controlled by an operational amplifier.

16. The amplifier of claim 15, wherein the high voltage high frequency inverter comprises a comparator to turn off the high voltage high frequency inverter when the output voltage is in regulation.

17. The amplifier of claim 15, wherein the high voltage high frequency inverter comprises:
    a comparator to turn off the high voltage high frequency inverter when the output voltage is in regulation; and
    a logic gate to turn the comparator on and off at a desired frequency.

18. The amplifier of claim 12, wherein the controlled charge and discharge circuit comprises a series stacked N-channel MOSFETs with balancing resistors for a controlled discharge, wherein the controlled discharge is controlled by an operational amplifier.

19. The amplifier of claim 12, wherein the controlled charge and discharge circuit comprises:
- an opto-coupler to allow the output load to have an undefined floating ground.

20. The amplifier of claim 12, wherein the multistage voltage multiplier generates the second high voltage DC by multiplying an input voltage by an integer that is equal to a number of stages of the multistage voltage multiplier.

* * * * *